June 17, 1941.    E. K. THOMASON    2,246,422
SACKING SCALE
Filed June 10, 1939    3 Sheets-Sheet 3
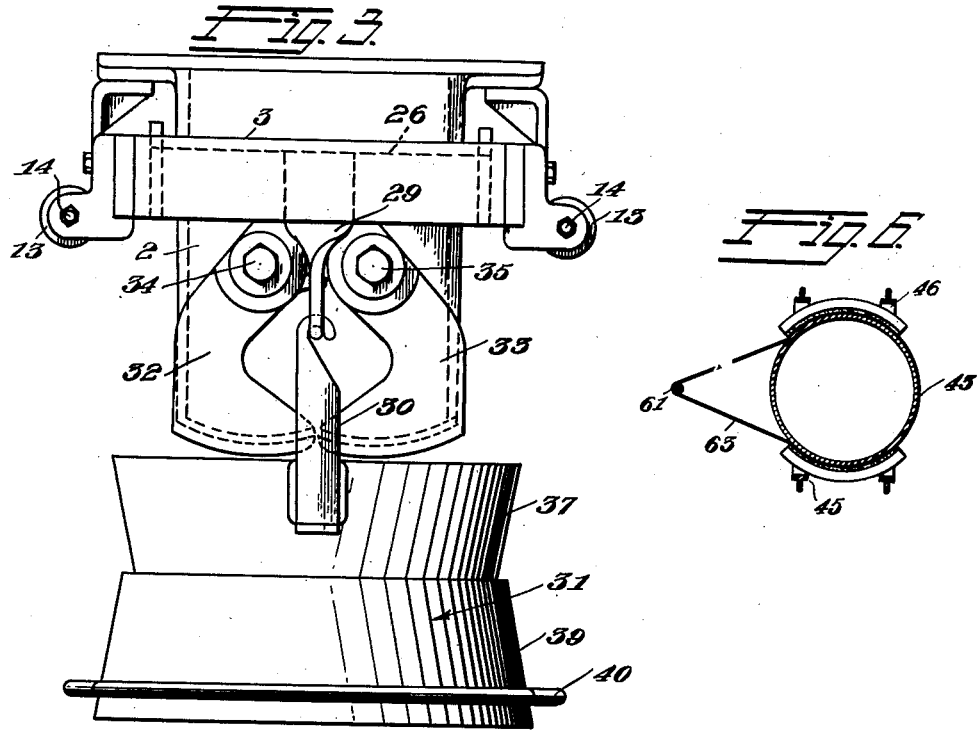
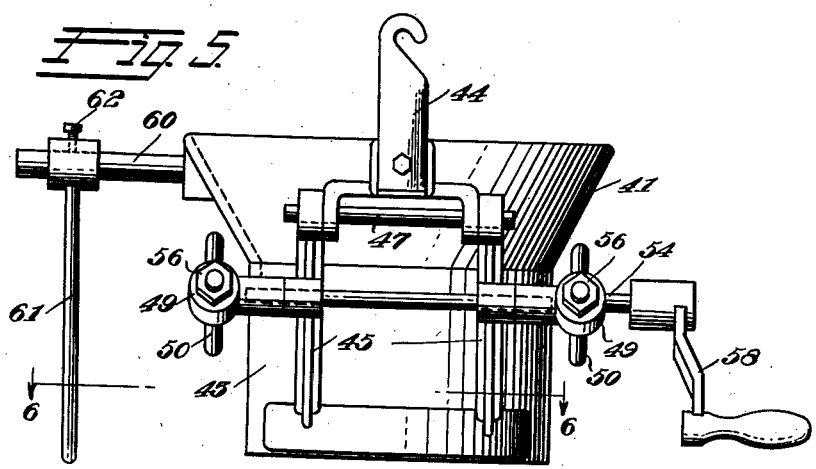
Inventor
Ernest K. Thomason
Wray N. Hoffman
Attorney Patented June 17, 1941

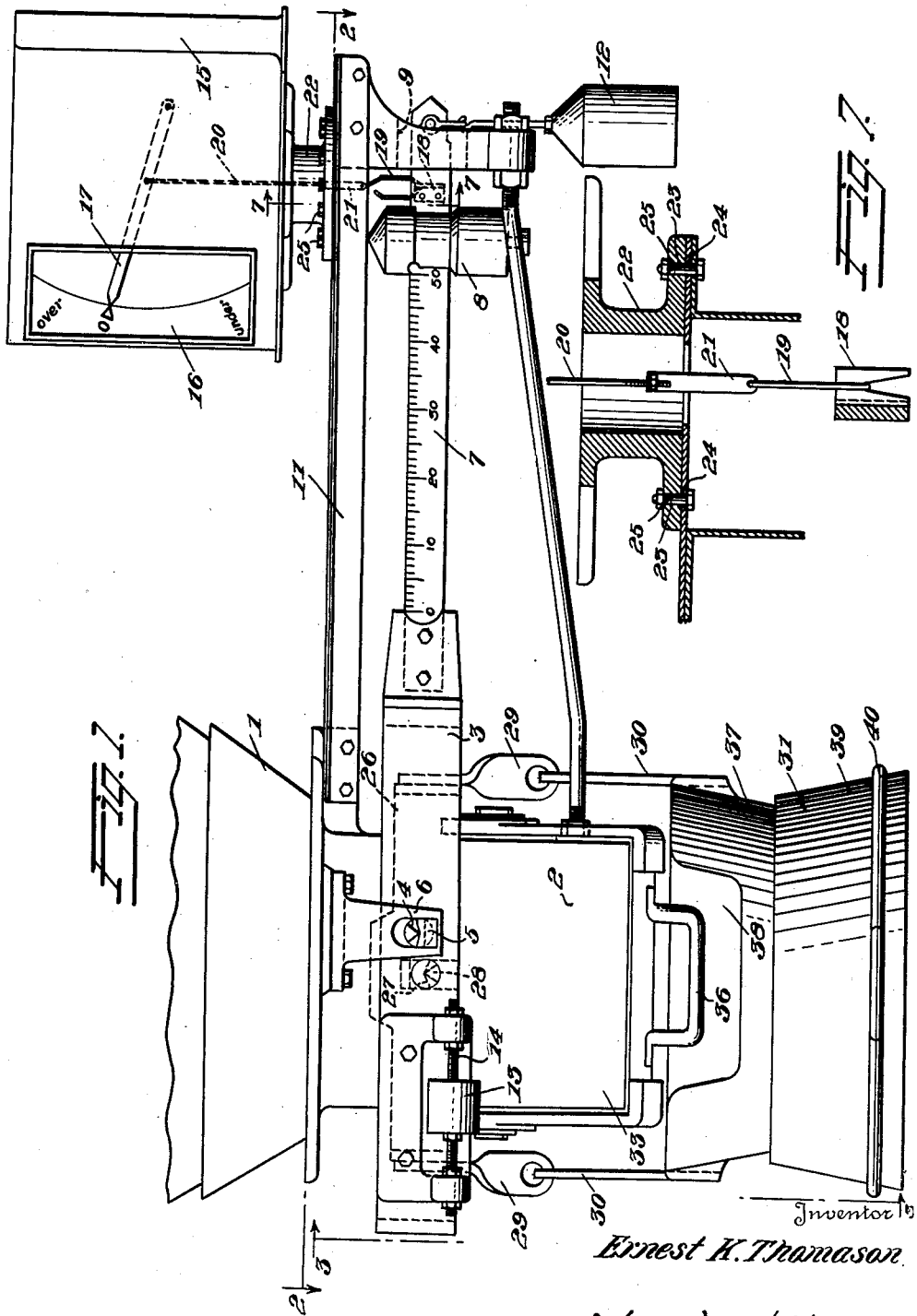

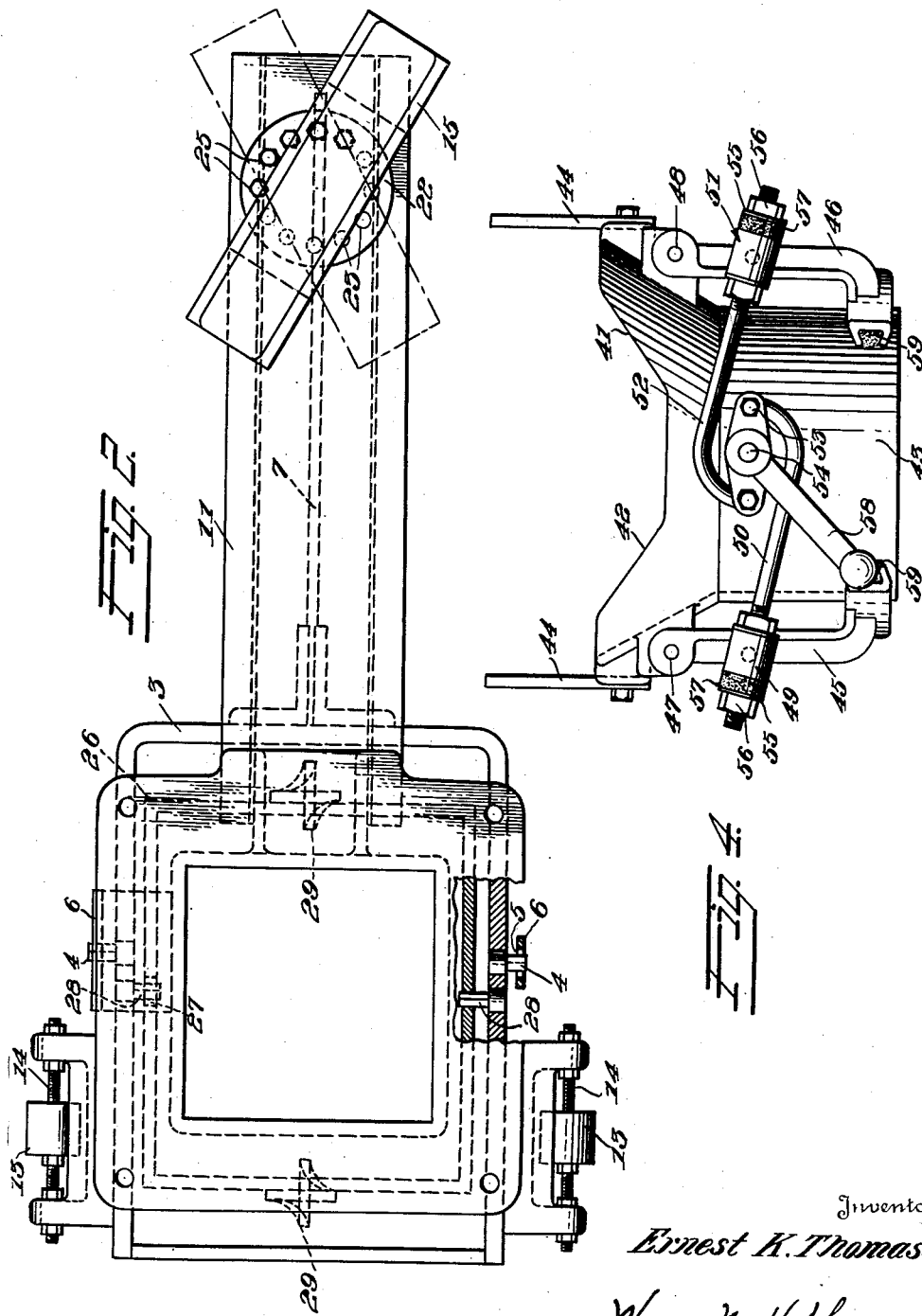

2,246,422

UNITED STATES PATENT OFFICE 2,246,422

SACKING SCALE

Ernest K. Thomason, Atlanta, Ga., assignor to Atlanta Utility Works, East Point, Ga., a corporation of Georgia Application June 10, 1939, Serial No. 278,549

7 Claims. (Cl. 265—51)

This invention relates to sacking scales. More particularly it has to do with the type of scales which is adapted to be assembled with a hopper containing the material to be weighed.

An object of the present invention is to provide a sacking scale which includes a scale beam and an over and under weight indicating mechanism in association therewith so located that the operator is in position facing the beam and indicating mechanism in his operations of delivering material into a material supporting means for weighing the desired quantity of material.

A further object of the present invention is to provide a sacking scale which includes an over and under weight indicating mechanism which is shiftable to a position such that it will be in a plane which is at an angle with respect to the scale beam.

A still further object of the present invention is to provide a sacking scale wherein the material supporting means is pivotally suspended from the scale beam.

A still further object of the present invention is to provide a sacking scale wherein the material supporting means is suspended from the scale beam in such manner that the valve means controlling the discharge of the material from the trough into a receptacle or sack carried by the material supporting means may be operated without interference with the said means.

A still further object of the present invention is to provide a sacking scale wherein the material supporting means includes a novel mechanism for detachably suspending a receptacle or sack therefrom.

Other objects and advantages will be apparent as the invention is described in greater detail in connection with the accompanying drawings wherein Figure 1 is a side elevational view of the sacking scale according to the present invention in association with a hopper.

Figure 2 is a plan view taken on the line 2—2 of Figure 1, partly in section showing the knife edge trunnions in mounted relation with the yoke and inner ring members.

Figure 3 is an end elevational view taken on the line 3—3 of Figure 1.

Figure 4 is a front elevational view of a modified form of sack holder.

Figure 5 is an end elevational view of the sack holder shown in Figure 4.

Figure 6 is a reduced sectional view taken on the line 6—6 of Figure 5.

Figure 7 is an enlarged sectional view taken on the line 7—7 of Figure 1.

Referring to Figures 1 and 2 of the drawings, the numeral 1 designates a hopper in which the material to be weighed is stored. Disposed in cooperative relation with the hopper 1 and secured thereto is a body member or trough 2. Surrounding the trough 2 is a yoke member 3 which is provided with opposed knife edge trunnions 4 protruding outwardly from the sides thereof, said trunnions being mounted in knife edge bearings 5 carried by the brackets 6 depending from the trough 2.

Secured to an end of the yoke member 3 is a scale beam 7 which has a poise 8 slidable along the graduated surface thereof. The outer end of the beam is adapted to operate in a trig loop 9 of conventional form which is formed in a bracket 10 depending from the outer end of a horizontal arm 11 carried by the trough 2. The extreme outer end of the beam 7 has a counterpoise 12 or weight hanging therefrom, which counterpoise is preferably removable. The rear portions of the yoke member 3 are provided with re-balancing weights 13 which are adjustable towards or from the knife edge bearings 5 by screw mechanisms 14. This mechanism may be used for rebalancing the beam, whenever necessary, in the well known manner.

Mounted upon the top of the horizontal arm 11 is a housing 15 which encloses an over and under weighing mechanism comprising an over and under weight chart 16 and an indicator or pointer 17 in cooperative relation with said chart mounted to oscillate in a vertical plane. As shown in Figures 1 and 7, the scale beam 7 adjacent the end extending through the trig loop 9 is provided with a metal hook 18 to which is attached a wire loop 19, said loop being connected to the pointer 17 through the medium of rod 20 and adjustable screw coupling 21.

By reference to Figures 2 and 7, it will be seen that the housing 15 has a flanged base portion 22 provided with a plurality of openings 23 spaced at about 30 degree intervals therealong which may be moved into complemental relation with corresponding openings 24 in the horizontal arm 11, and the base portion 22 and arm locked together by means of bolts 25. By this means, it is possible to shift the indicating mechanism to a position such that it will be in a plane which is at an angle with respect to the scale beam 7.

Disposed intermediate the yoke member 3 is a ring member 26 which, as shown in Figures 1 and 2 is provided with opposed knife edge bearings 27 in which are mounted knife edge trunnions 28 protruding inwardly from the sides of the yoke member. The ring member 26 is also provided at its opposed ends with metal loop members 29 which receive hooks 30 carried by a material supporting means or sack holder 31.

The trough 2, Figure 3, has a valved bottom which comprises a pair of jaw shaped members 32 and 33 pivoted to the trough 2 as at 34 and 35. It is to be noted that the jaw members are so mounted on the trough as to be movable toward and away from the bottom in a plane at right angles with respect to the scale beam. As shown in Figure 1, the jaw shaped member 33 is provided with a pull handle 36.

The sack holder 31 comprises a hood 37 provided with a cut out portion 38, equipped with a conical downwardly flaring chute 39 upon which rests a ring 40.

In operation of the sacking scale thus described, the ring 40 is slid upwardly upon the base 39, the top of a receptacle or sack being slipped between the ring 40 and the base, whereupon the ring is permitted to drop downwardly to engage the sack. After the sack has been mounted in place, the pull handle 36 is pulled outwardly to open the trough 2 whereupon the contents of the hopper 1 will flow into the sack. The poise 8 having been moved to a predetermined position on the scale beam 7 and the counterpoise 12 of the desired weight having been suspended from the end of the beam, the material from the hopper 1 will flow through the trough 2 into the sack until the indicator 17 has moved to zero position on the chart 16, whereupon the pull handle 36 is pushed to closed position cutting off further flow from the hopper into the sack.

If desired, the sack holder shown in Figures 4 and 5 may be used in place of sack holder 31. Such sack holder comprises a hood 41 provided with a cut out portion 42 equipped with a non-flaring depending chute 43. Projecting from the sides of the hood 41 are upstanding hooks 44 for attachment to the metal loop members 29 carried by the ring member 26. The chute 43 includes a mechanism for detachably securing a sack to the bottom thereof, such mechanism comprising a pair of oppositely disposed clamp members 45 and 46 pivotally mounted as at 47 and 48 on the hood 41.

Clamp member 45 carries a T head 49 through which extends the threaded end of a pair of toggle links 50. The other clamp member 46 also carries a T head 51 through which extends the threaded end of a pair of toggle links 52. The opposite ends of both pairs of toggle links 50 and 52 are secured to cross heads 53 carried by a shaft 54 passing through the chute 43. The threaded ends of both pairs of toggle links 50 and 52 are secured to the T heads 49 and 51 by means of steel lock washers 55 and threaded nuts 56. Interposed between the steel lock washers 55 and the T heads 49 and 51 are rubber inserts 57. It is to be noted that Figures 4 and 5 only show one of the pairs of toggle links 50 and 52 and one of the cross heads 53 disposed on the one side of the chute 43. Since the disposition of the other of these elements on the opposed side of the chute 43 is the same, a further additional view which would merely be a duplication of Figure 4, appears unnecessary for a proper understanding of this mechanism. Mounted on the shaft 54 is a crank handle 58.

As shown in Figure 4, the ends of the clamp members 45 and 46, which are adapted to engage with the walls of the chute 43, are provided with rubber inserts 59. When the crank handle 58 is actuated so as to cause the clamp members 45 and 46 to be moved to the position of engagement with the walls of the chute 43, the rubber inserts 57 act to take up the slack as soon as the toggle mechanism has passed center, thereby keeping the clamp members tight to the chute 43.

Referring to Figure 5, it will be seen that the hood 41 is provided with a stud 60 on which is slidably mounted a finger 61. The finger 61 includes a pin 62 for locking it in place on said stud. This mechanism is for the purpose of mounting sacks of different size openings on the chute 43. In operation, the top of the sack is caused to engage with the side of the chute 43 and then stretched transversely until the finger 61 is insertable within the opposite end of the sack opening, whereupon the finger is moved outwardly or inwardly, depending on the size of the sack opening, along the stud 60 until the sack opening is positioned tightly over the bottom of the chute. When the sack 63 has been positioned as shown in Figure 6, the pin 62 is turned downwardly on the stud 60, thereby locking the finger 61 in place.

It will be understood that the sacking scale may be constructed and arranged as best suited to meet the requirements of use and that, except as pointed out in the accompanying claims, the invention is not restricted to the particular construction and arrangement shown and described herein.

Having thus described the invention, what is claimed as new and desired to be secured by Letters Patent is:

1. In a sacking scale, a movable yoke member fulcrumed to oscillate in a vertical plane, a scale beam having an end thereof secured to said yoke member, an over and under weight indicating mechanism arranged in superimposed relation with respect to said beam, said mechanism comprising an over and under weight chart and an indicator in cooperative relation with said chart mounted to oscillate in a vertical plane, and means for operatively connecting said indicator to said beam in such a manner that the indicator will move in a direction corresponding to the direction of movement of the beam, said indicating mechanism being adapted to be adjusted to a plurality of angular positions about its vertical axis so that it may be positioned to face in an angular plane relative to said beam.

2. In a sacking scale, a trough including a horizontal arm provided with a plurality of openings extending through the top thereof disposed in a circle, a movable yoke member fulcrumed on said trough to oscillate in a vertical plane, a scale beam having an end thereof secured to said yoke member and extending beneath said arm, a housing mounted upon the top of said arm, an over and under weight indicating mechanism disposed within said housing, said mechanism comprising an over and under weight chart and an indicator in cooperative relation with said chart mounted to oscillate in a vertical plane, and means for operatively connecting said indicator to said beam in such a manner that the indicator will move in a direction corresponding to the direction of movement of the beam, said housing being provided at its bottom with a plurality of openings disposed in a circle and adjustable so that any one of its openings may be shifted into complemental relation with openings in said arm to thereby mount the indicating mechanism in a plurality of angular positions about its vertical axis so that it may be positioned to face in an angular plane relative to said beam.

3. In a sacking scale, a trough including a horizontal arm, a movable yoke member fulcrumed on said trough to oscillate in a vertical plane, a scale beam having an end thereof secured to said yoke member and extending beneath said arm, a housing mounted upon the top of said arm, an over and under weight indicating mechanism disposed within said housing, said mechanism comprising an over and under weight chart and an indicator in cooperative relation with said chart mounted to oscilalte in a vertical plane, and means for operatively connecting said indicator to said beam in such a manner that the indicator will move in a direction corresponding to the direction of movement of the beam, said housing being adapted to be adjusted to a plurality of angular positions about its vertical axis so that the indicating mechanism may be positioned to face in an angular plane relative to said beam.

4. In a sacking scale, a trough including a horizontal arm, a movable yoke member fulcrumed on said trough to oscillate in a vertical plane, a scale beam having an end thereof secured to said yoke member and extending beneath said arm, a poise slidable on said beam, a counterpoise adapted to be operatively connected to the free end of said beam, a housing mounted upon the top of said arm, an over and under weight indicating mechanism disposed within said housing, said mechanism comprising an over and under weight chart and an indicator in cooperative relation with said chart mounted to oscillate in a vertical plane, means for operatively connecting said indicator directly to the free end of said beam in such a manner that the indicator will move in a direction corresponding to the direction of movement of the beam, said housing being adapted to be adjusted to a plurality of angular positions about its vertical axis so that the indicating mechanism may be positioned to face in an angular plane relative to said beam.

5. In a sacking scale, a trough, a movable yoke member fulcrumed on said trough to oscillate in a vertical plane, a scale beam having an end secured to said yoke member, a ring member disposed within said yoke member and pivotally suspended from the latter, a material supporting means in association with said trough and suspended from said ring member, and an angularly adjustable over and under weight indicating mechanism associated with said beam.

6. In a sacking scale, a trough, a movable yoke member fulcrumed on said trough to oscillate in a vertical plane, a scale beam having an end secured to said yoke member, a ring member disposed within said yoke member and pivotally suspended from the latter, valve means closing the bottom of said trough and movable toward and away from said bottom in a plane at right angles with respect to said beam, and a material supporting means in association with said trough suspended from said ring member, and an angularly adjustable over and under weight indicating mechanism associated with said beam.

7. In a sacking scale, a trough, a movable yoke member fulcrumed on said trough to oscillate in a vertical plane, a scale beam having an end thereof secured to said yoke member, an over and under weight indicating mechanism comprising an over and under weight chart and an indicator in cooperative relation with said chart mounted to oscillate in a vertical plane, means for operatively connecting said indicator to said beam in such a manner that the indicator will move in a direction corresponding to the direction of movement of the beam, said indicating mechanism being adapted to be adjusted to a plurality of angular positions about its vertical axis so that it may be positioned to face in an angular plane relative to said beam, and means carried by said yoke member for supporting a receptacle being weighed out.

ERNEST K. THOMASON.